US012614466B2

(12) United States Patent  (10) Patent No.: US 12,614,466 B2
Shamasundar et al.  (45) Date of Patent: Apr. 28, 2026

(54) GENERATING AIR TRAFFIC CONTROL (ATC) REQUESTS ON AN ONBOARD OR AN OFFBOARD AVIONICS DEVICE WITH A GRAPHICAL DISPLAY

(71) Applicant: Honeywell International Inc., Morris Plains, NJ (US)

(72) Inventors: Raghu Shamasundar, Bangalore (IN); Thomas D. Judd, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 1115 days.

(21) Appl. No.: 16/448,288

(22) Filed: Jun. 21, 2019

(65) Prior Publication Data

US 2020/0402412 A1 Dec. 24, 2020

(51) Int. Cl.
| | |
|---|---|
| *G08G 5/34* | (2025.01) |
| *G01C 23/00* | (2006.01) |
| *G06F 3/0488* | (2022.01) |
| *G08G 5/21* | (2025.01) |
| *G08G 5/26* | (2025.01) |

(52) U.S. Cl.
CPC ............ *G08G 5/34* (2025.01); *G01C 23/005* (2013.01); *G06F 3/0488* (2013.01); *G08G 5/21* (2025.01); *G08G 5/26* (2025.01)

(58) Field of Classification Search
CPC .. G08G 5/0013; G08G 5/0021; G08G 5/0039; G08G 5/003; G08G 5/0078; G08G 5/0091; G08G 5/0047; G08G 5/0052; G08G 5/04
See application file for complete search history.

(56) References Cited

U.S. PATENT DOCUMENTS

| | | | |
|---|---|---|---|
| 9,224,301 B2 | 12/2015 | Pakki et al. | |
| 9,280,903 B2 * | 3/2016 | Judy ...................... | G08G 5/003 |
| 10,026,324 B2 | 7/2018 | Shamasundar et al. | |
| 2010/0332054 A1 * | 12/2010 | Brandao .............. | G08G 5/0039 |
| | | | 701/3 |
| 2013/0028174 A1 * | 1/2013 | Cabos ................... | H04L 51/063 |
| | | | 370/316 |
| 2014/0300495 A1 * | 10/2014 | Scheu .................. | G08G 5/0013 |
| | | | 340/961 |

(Continued)

*Primary Examiner* — Angela Y Ortiz

*Assistant Examiner* — Aarron E Santos

(74) *Attorney, Agent, or Firm* — Fogg & Powers LLC

(57) ABSTRACT

A method for generating an air traffic control (ATC) request is provided. The method includes receiving input on at least one of an onboard graphical display avionics device or an offboard avionics device to request a change to a current flight parameter based on an active state of the aircraft, generating an air traffic control request, on one of the onboard graphical display avionics device or the offboard avionics device, based on the input using an air traffic control interface application, presenting, on one of the onboard graphical display avionics device or the offboard avionics device, the generated air traffic control request; and when the air traffic control request is approved to be sent, passing the generated air traffic control request to an air traffic control application on a communications management unit (CMU), Communications Management Function (CMF) or a flight management system (FMS).

20 Claims, 9 Drawing Sheets

(56)          References Cited

U.S. PATENT DOCUMENTS

2014/0336915 A1 *  11/2014  Pakki ................... G08G 5/0013
                                                             701/120
2016/0125744 A1 *   5/2016  Shamasundar .......... G08G 5/80
                                                             701/122
2017/0076611 A1 *   3/2017  Shamasundar ...... G08G 5/0013

* cited by examiner

GENERATING AIR TRAFFIC CONTROL (ATC) REQUESTS ON AN ONBOARD OR AN OFFBOARD AVIONICS DEVICE WITH A GRAPHICAL DISPLAY

BACKGROUND

The flight crew of modern aircraft perform many tasks while traveling between origin and destination of a flight. Each of these tasks requires the attention of one or more flight crew members. While performing many of these tasks, the flight crew may look at instruments, gauges, switches, checklists or other information or equipment to aid in operation of the aircraft. In such instances, the gaze of the flight crew is not focused on the scene in front of the aircraft. This so-called "heads down" time can prevent the flight crew from seeing what is happening in front of the aircraft and, in some instances, lead to accidents resulting in significant loss of life and property.

The coordination of the many commercial and private aircraft is controlled by the Air Traffic Control (ATC) system. The ATC system includes many ground systems or ground stations that send uplink messages to, and receive downlink messages from, aircraft. Many of these messages are sent as digital messages over a datalink referred to as the Controller-Pilot Data Link Communication (CPDLC). In the future, most of the ATC communication will be carried out through digital media such as CPDLC messages. During a flight, many messages are exchanged between the Crew and the ATC system. Messages exchanged between the aircraft and the ATC ground stations include, but are not limited to, route clearances, lateral diversions, vertical diversions, speed changes, route modifications, and the like.

To initiate an ATC request for approval to change the current flight parameter (e.g., flight plan, altitude or speed), the flight crew creates a request message (also referred to herein interchangeably as an ATC request or an ATC downlink message). Currently, the flight crew builds a request message to be sent to an ATC ground system on an ATC application which may be hosted in a Communication Management Function (CMF) or Flight Management Function (FMF) of the aircraft. Once the request is generated, it is sent to the ATC ground system for approval. If approved, the ATC ground system sends an uplink message to approve the request and any necessary or data will be loaded into the avionics system. Unfortunately, creating, approving and sending an ATC request message using the ATC application is time intensive. If these messages can be created more rapidly, then approval of the request will be faster and the aircraft may be able to move to a more efficient, safe, or comfortable route sooner. The longer it takes a flight crew to create a clearance request, the more likely it is to have been overtaken by events. For example, with the current approach to generating an ACT request, when an aircraft is experiencing turbulence, the time required to create an ATC request and to receive approval for a change in altitude, speed, and/or route may delay moving the aircraft to a safer, more comfortable and efficient altitude, speed or route.

Thus, there is a need in the art for improvements to the systems and processes used by flight crews to generate ATC requests or messages to reduce the time it takes to resolve issues with the current flight parameters and thus improve the safety, comfort, and efficiency of the crew, passengers and aircraft.

SUMMARY

In one embodiment, a method for generating an air traffic control (ATC) request is provided. The method includes receiving input on at least one of an onboard graphical display avionics device or an offboard avionics device to request a change to a current flight parameter based on an active state of the aircraft, generating an air traffic control request, on one of the onboard graphical display avionics device or the offboard avionics device, based on the input using an air traffic control interface application, presenting, on one of the onboard graphical display avionics device or the offboard avionics device, the generated air traffic control request; and when the air traffic control request is approved to be sent, passing the generated air traffic control request to an air traffic control application on a communications management unit (CMU), Communications Management Function (CMF) or a flight management system (FMS).

DRAWINGS

Embodiments of the present invention can be more easily understood and further advantages and uses thereof more readily apparent, when considered in view of the description of the embodiments and the following figures in which.

In accordance with common practice, the various described features are not drawn to scale but are drawn to emphasize features relevant to the various embodiments of the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the present invention. The following detailed description is, therefore, not to be taken in a limiting sense.

Figure 1:
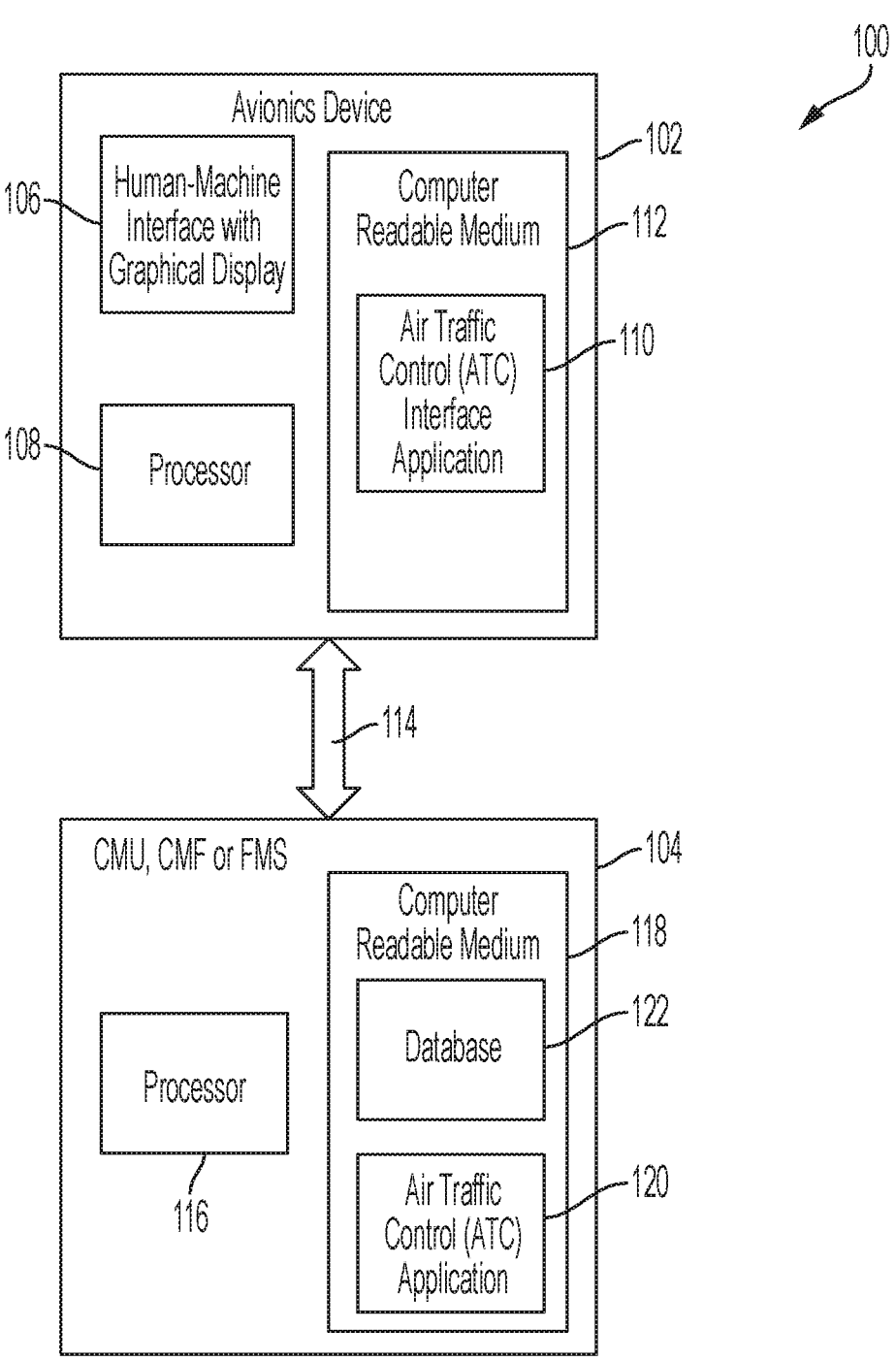
FIG. 1 is a block diagram of one embodiment of a system for generating an air traffic control (ATC) downlink message (request) on an avionics device with a graphical display.

I. Generating Air Traffic Control (ATC) Downlink Messages with an Avionics Device FIG. 1 is a block diagram of one embodiment of a system, indicated generally at 100, for generating an air traffic control (ATC) downlink message (request) on an avionics device 102 having a human-machine interface with a graphical display (HMI)106 (also referred to as a "graphical display avionics device"). In addition to the graphical display 106, the avionics device 102 includes a processor 108 and a non-transitory computer readable medium 112. The computer readable medium 112 stores an air traffic control (ATC) interface application described in more detail below. The avionics device 102 supporting graphical displays may be an onboard avionics device or an offboard avionics device. For purposes of this specification, an "offboard avionics device" is an avionics device that is portable and can be taken off an aircraft such as a Maintenance Terminal, a Cabin terminal, an electronic flight bag (EFB), tablet, smart phone or other portable electronic device (PED) that is capable of running one or more avionics software applications with a graphical display or interface. Further, an "onboard avionics device" is an avionics device that is installed in the cockpit of an aircraft. Examples of onboard avionics devices with graphical displays that can be used in system 100 include but are not limited to: a navigational display, or a primary flight display. Advantageously, the HMI with graphical display 106 of these onboard and offboard avionics devices lend themselves to a more intuitive approach to building the ATC request. The HMI with graphical display 106 enables the flight crew to visualize the data, and using a touchscreen or cursor selection capability, for example, enables the flight crew to input or select data. Thus, by composing an ATC request on the HMI with graphical display 106 of the avionics device 102, the flight crew can operate more quickly and effectively in requesting variations from the current flight parameters, such as, flight plan, altitude or speed.

The avionics device 102 leverages off an air traffic control (ATC) application running on a platform 104 in the cockpit of the aircraft. In some aircraft, the ATC function resides on a communications management unit (CMU). In other aircraft, the ATC function resides on a Flight Management System (FMS). Finally, on other aircraft, the traditional CMU is replaced with a CMU-like function residing on an integrated platform called a Communications Management Function (CMF). For purposes of simplicity, throughout this specification, the term communication management unit (CMU) 104 is used generically to refer to a CMU, CMF or FMS. The CMU 104 is used to generate the ATC downlink message. The CMU 104 includes processor 116 and non-transitory computer readable medium 118. Computer readable medium 118 stores a database 122 and an air traffic control (ATC) application 120. In one embodiment, the database 122 captures information from the specific avionics devices 102 coupled to CMU 104 when each device registers with the CMU 104. In one example, the database 122 captures an indication of the message type and data that will be provided to the CMU 104 by the ATC interface application 110 to request the generation of an ATC downlink message. In other embodiments, the data in database 122 could be hard-coded or embedded in software or other appropriate mechanism for storing the data on CMU 104.

Figure 2:
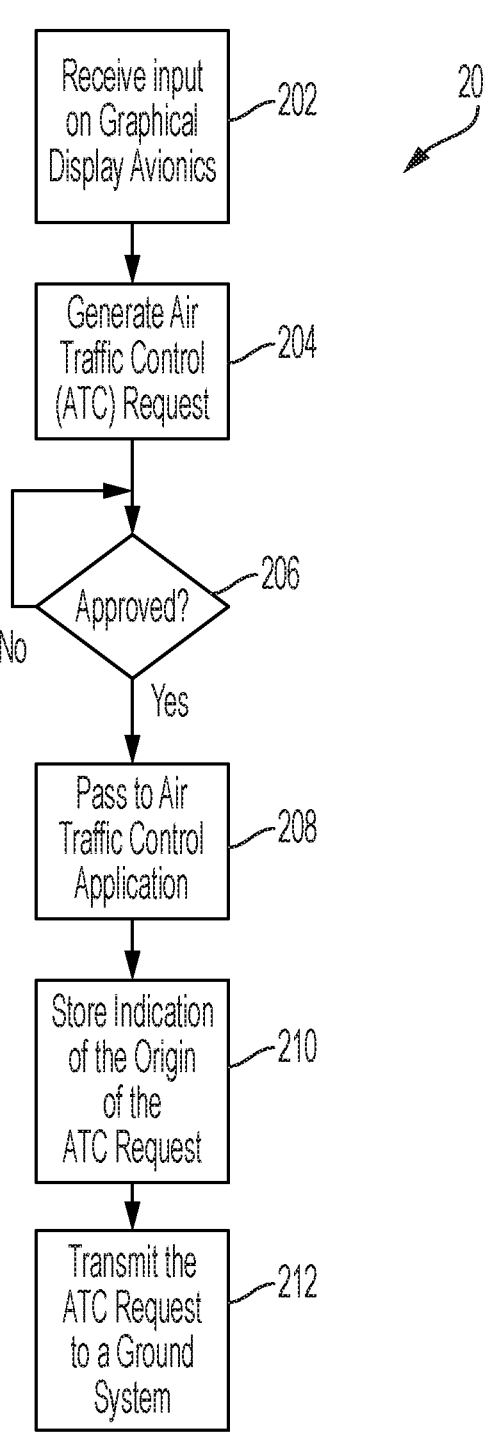
FIG. 2 is a flow chart of one embodiment of a process for generating an ATC downlink message on a graphical display of an avionics device.

In operation, the ATC application 120 responds to a call from the ATC interface application 110 to generate an ATC downlink message for the avionics device 102. FIG. 2 provides one example of a process 200 for generating an ATC downlink message on the system of FIG. 1. At block 202, a flight crew member enters data for an ATC downlink message, such as a request to change the speed and/or altitude of the aircraft, using the HMI with graphical display 106 of the avionics device 102. In one embodiment, HMI with graphical display 106 includes a touchscreen or a cursor control device such as a trackball or mouse. At block 204, process 200 generates the ATC downlink message or request. For example, in one embodiment, the ATC interface application 110, running on processor 108, sends a message over bus 114 to CMU 104 to request generation of the ATC downlink message using the data gathered via the HMI with graphical display 106 of the avionics device 102. The ATC application 120, running on processor 116, generates the ATC downlink message and sends the generated message to the avionics device 102 over bus 114. Alternatively, ATC interface application 110 of avionics device 102 generates the ATC downlink message directly on avionics device 102. At block 206, process 200 determines whether the ATC downlink message or request is approved for sending to the ATC ground station by the flight crew. For example, ATC interface application 110 presents the message to the flight crew member on graphical display 106 for approval. At block 208, when the flight crew has approved the ATC downlink message, process 200 passes the approval or ATC downlink message to the CMU 104. For example, ATC interface application 110 sends the approval or ATC downlink message over bus 114 to CMU 104. At block 210, process 200 stores an indication of the origin of the ATC downlink message or request. And, at block 212, process 200 causes ATC application 120 to send the ATC downlink message to an air traffic control (ATC) center via a ground station or system.

II. Generating ATC Downlink Messages on an Avionics Device

A. System

Figure 3:
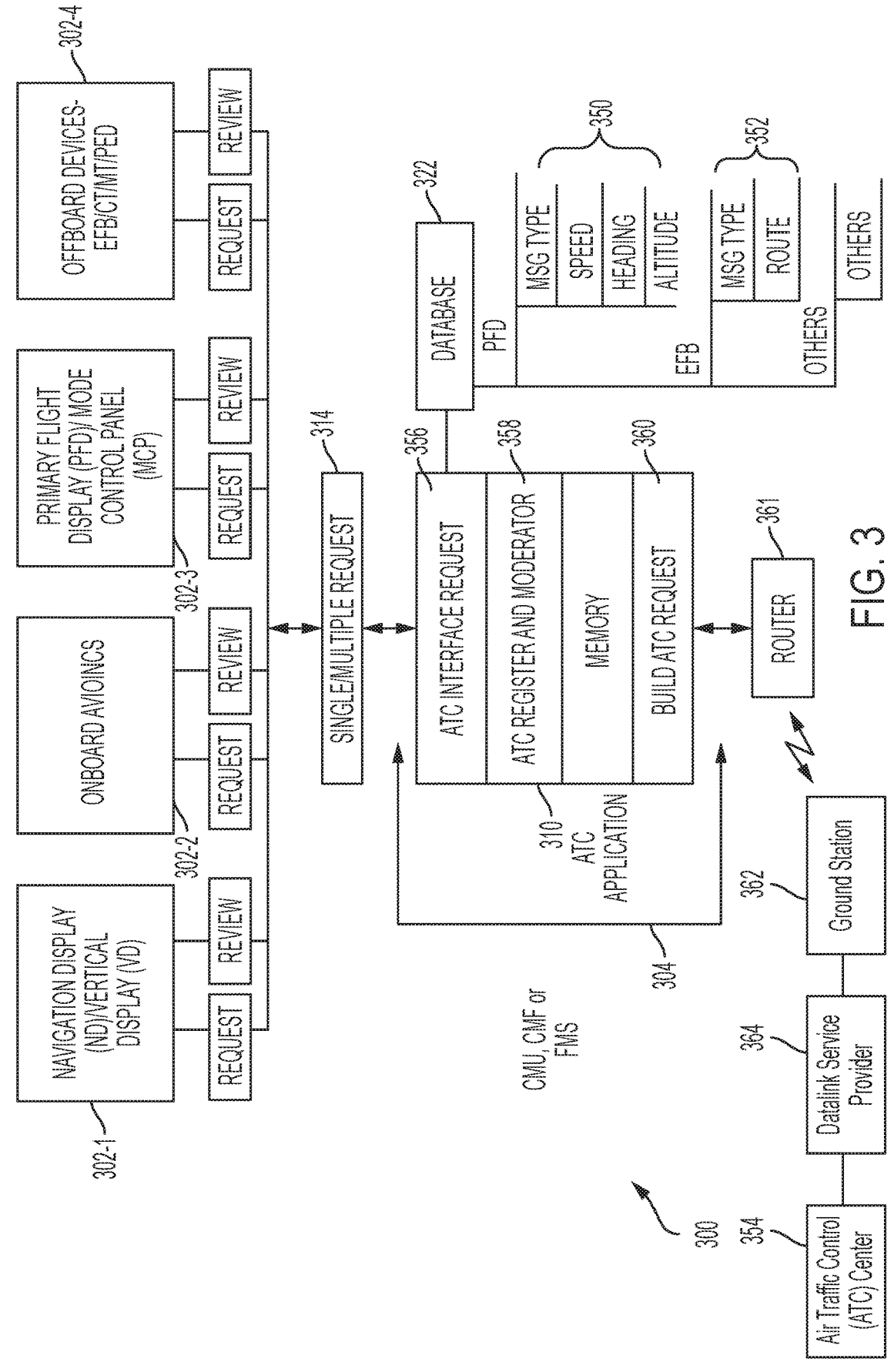
FIG. 3 is a block diagram of another embodiment of a system for generating an ATC downlink message on an avionics device with a graphical display.

FIG. 3 is a block diagram of another embodiment of a system, indicated generally at 300, for generating an ATC downlink message on an avionics device with a graphical display. In this embodiment, a plurality of possible avionics devices are shown. For example, system 300 includes one or more of a navigation display (ND)/vertical display (VD) 302-1, on-board avionics 302-2, primary flight display (PFD)/mode control panel (MCP) 302-3, and offboard devices 302-4 such as an electronic flight bag (EFB), smart phone, tablet or other portable electronic device (PED), a cabin terminal (CT), and a maintenance terminal (MT). Each of these avionic devices includes a graphical display that can be used by a flight crew member to enter data for creating an air traffic control (ATC) downlink message or request. Further, as shown in FIG. 1, each of these avionics devices also includes a processor and a computer readable medium that stores an ATC interface program for use in generating the ATC downlink message. For simplicity, these details of the avionics devices are not shown in FIG. 3.

System 300 includes a Communication Management Unit (CMU) 304. As with FIG. 1, CMU 304 includes a processor and a computer readable medium (not shown) that store an ATC application 310 and database 322. ATC application 310 includes functions for interfacing with the various avionics devices 356, an ATC register and moderator 358 that tracks the avionics devices that can request ATC downlink messages, and a function to build ATC requests 360. Further, CMU 304 is in communication with air traffic control (ATC) center 354. CMU 304 includes a router 361 which communicated by radio link to ground station 362. Ground station 362 communicates with ATC center 354 via datalink service provider 364.

Database 322 stores data related to the avionics devices connected to CMU 304. For example, when a primary flight display 302-3 registers with CMU 310, database 322 is updated with information regarding the characteristics of messages from PFD 302-3 used when requesting the ATC application to generate an ATC downlink message or request. As indicated at 350, for PFD 302-3, database includes an indication of the message type, and the parameters that may be received from the PFD 302-3, such as speed, heading and altitude. When an electronic flight bag is registered with CMU 304, database 322 is updated with information regarding the parameters that may be involved in a request for an ATC downlink message such as message type and route as indicated at 352. In other embodiments, the data of database 322 is hard-coded or embedded in software or other appropriate mechanism for storing the data on CMU 304.

B. Use Case: Route Change Request from Navigational Display Unit

In operation, the ATC application 310 responds to a call from an ATC interface application of one of the avionics devices 302-1 to 302-4 to generate an ATC downlink message for the respective avionics device 302-1 to 302-4. For ease of explanation, the operation of system 300 will be explained in terms of a request generated by navigational display 302-1. However, it is understood that requests can be generated by any avionics device that is registered with CMU 304, including but not limited to, onboard avionics 303-2, primary flight display 302-3 and offboard devices 302-4.

Figures 4A, 4B:
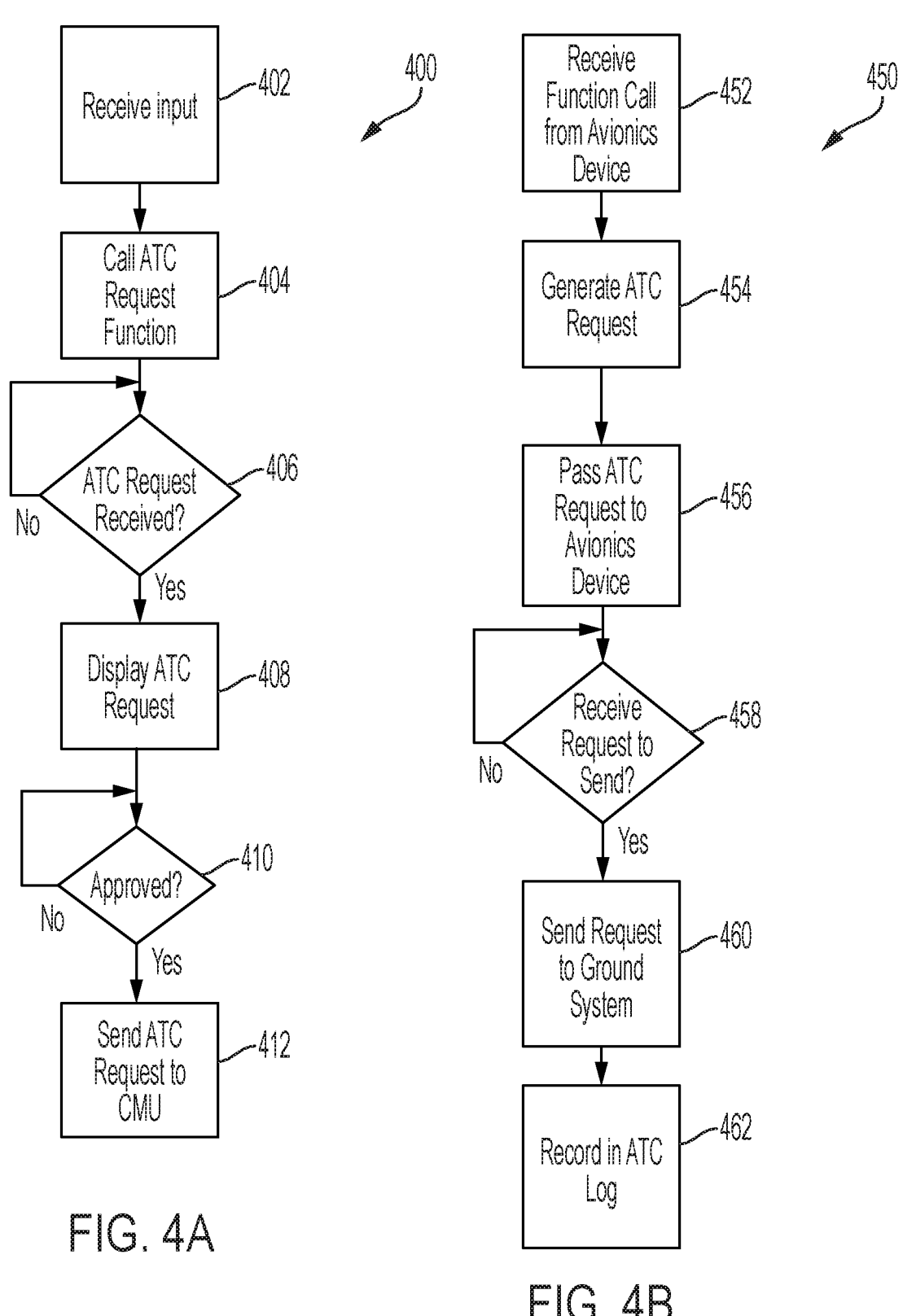
FIGS. 4A and 4B are flow charts that illustrate processes used in generating an ATC downlink message on a graphical display of an avionics device.

FIGS. 4A and 4B provides examples of processes, indicated generally at 400 and 450, for generating an ATC downlink message on the system of FIG. 3. In this example, process 400 of FIG. 4A is performed on navigational display 302-1 and is an example of an ATC interface application shown in FIG. 1. Further, process 450 is an example of a portion of the ATC application 310 that interacts with process 400 of FIG. 4A to produce the ATC downlink message.

Figure 5:
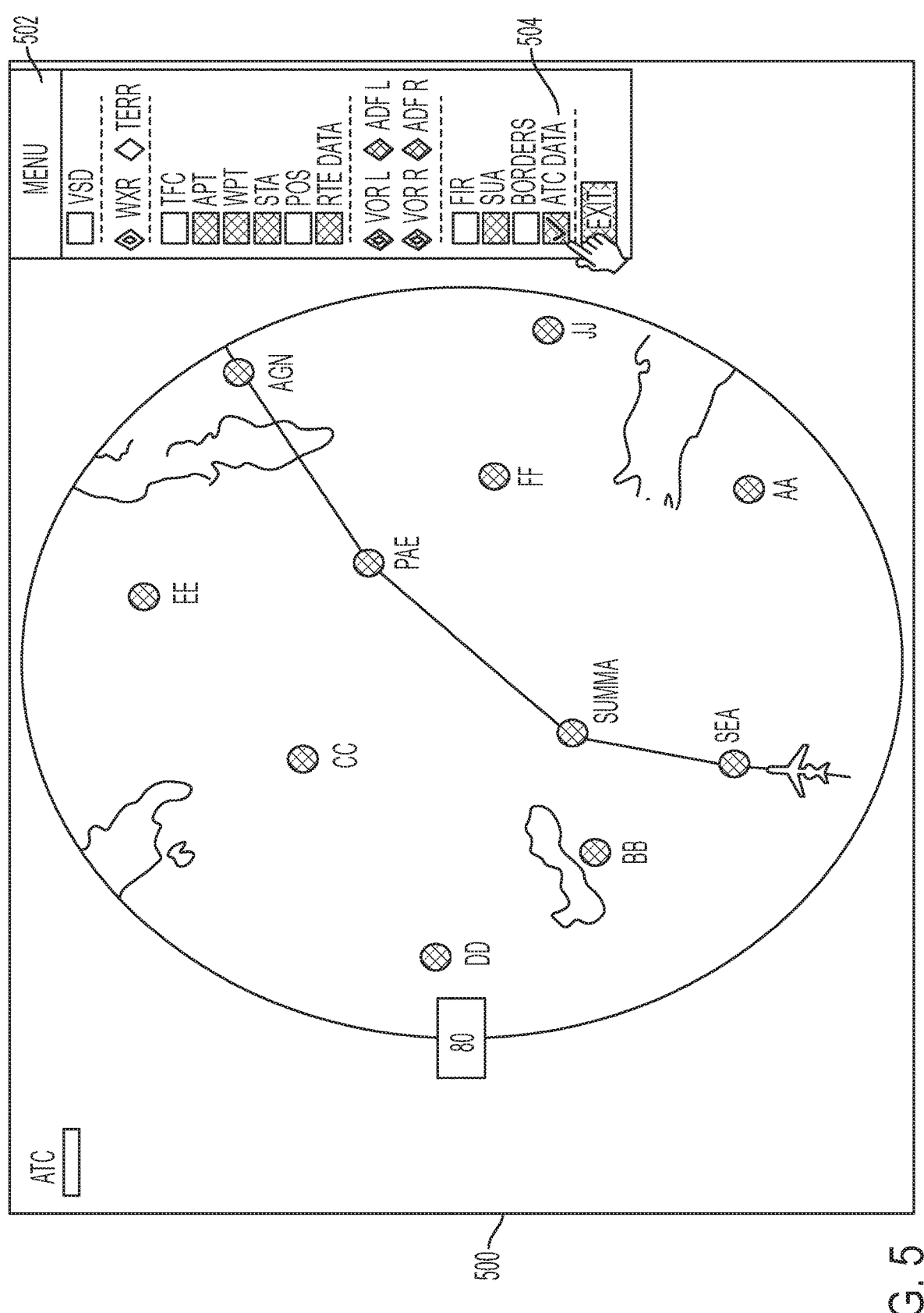
FIGS. 5 and 6 illustrate one example of generating an ATC downlink message from a navigational display unit.
Figure 6:
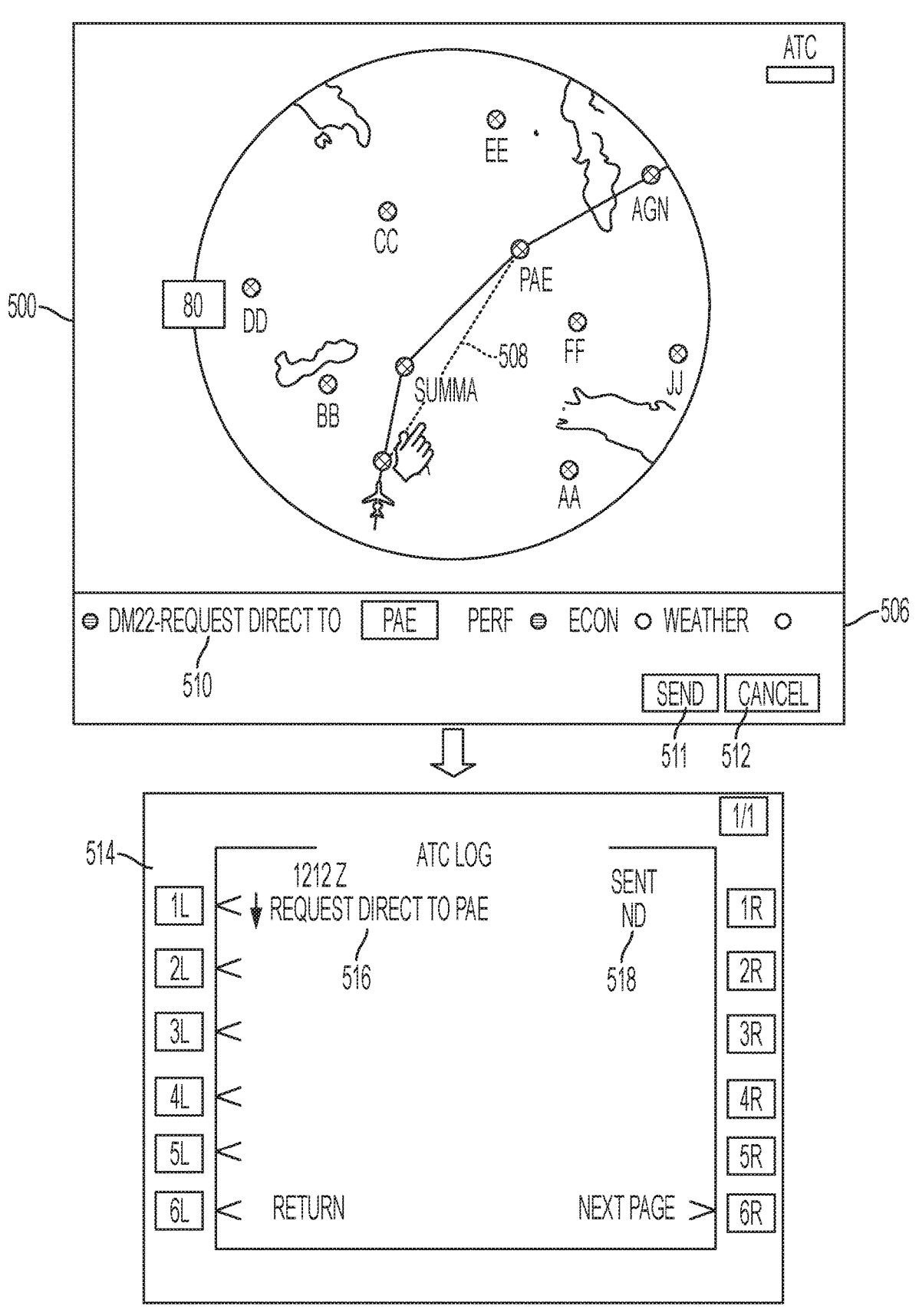

At block 402, process 400 receives input from the flight crew on navigation display 302-1 to generate an ATC downlink message. For example, FIG. 5 illustrates one embodiment of a graphical display of a navigation display 302-1. In this embodiment, graphical display 500 includes a menu 502 that includes a box for selecting the feature to generate an ATC downlink request. Thus, when an ATC downlink request is needed, a member of the flight crew clicks on the box next to "ATC Data" as indicated at 504 on graphical display 500 using with a touch screen input or other type of cursor control. As shown in FIG. 6, ATC request section 506 is shown on graphical display 500. Additionally, in response to flight crew action, data is gathered from graphical display 500 to aid in generating an appropriate ATC downlink message. For example, the flight crew member simply taps on the desired change to the route on graphical display 500 (such as a touchscreen). In this example, the flight crew member draws a line between the current position and the desired waypoint or destination, PAE. With this input, process 400 issues a call to the ATC application 310 on CMU 304 at block 404 to generate the ATC downlink message with the data gathered from the flight crew via the navigational display 302-1. At block 406, process 400 waits for the ATC downlink message from CMU 304.

Process 450 generates the ATC downlink message based on data from navigational display 302-1. At block 452, process 450 receives the call from navigational display 302-1 including the data to be used in the ATC downlink message. At block 454, process 450 generates the ATC request using build ATC request function 360. Build ATC request function 360 builds the ATC downlink message using the data from navigational display 302-1. At block 456, the ATC downlink message is passed to the navigational display 302-1. At block 458, process 450 waits for approval to send the ATM downlink message to the ATC center 354.

At block 408, the ATC downlink message is displayed at 510 to the flight crew for approval once received from the ATC application 310. If the ATC downlink message is acceptable to the flight crew member, the flight crew member clicks the send button 511. Process 400 determines that the ATC downlink message is approved at 410 and notifies the CMU to send the ATC downlink message at 412. If the message is not acceptable to the flight crew member, the flight crew member so indicates by clicking on cancel button 512

As mentioned, process 450 waits for the approval to send the ATC downlink message at 458. When received, process 450 sends the ATC downlink message to the ATC center 354 at block 460. At block 462, process 450 records the ATC downlink message in ATC log 514 at entry 516 with an indication at 518 that the ATC downlink message was generated on the navigational display 302-1.

Figure 7:
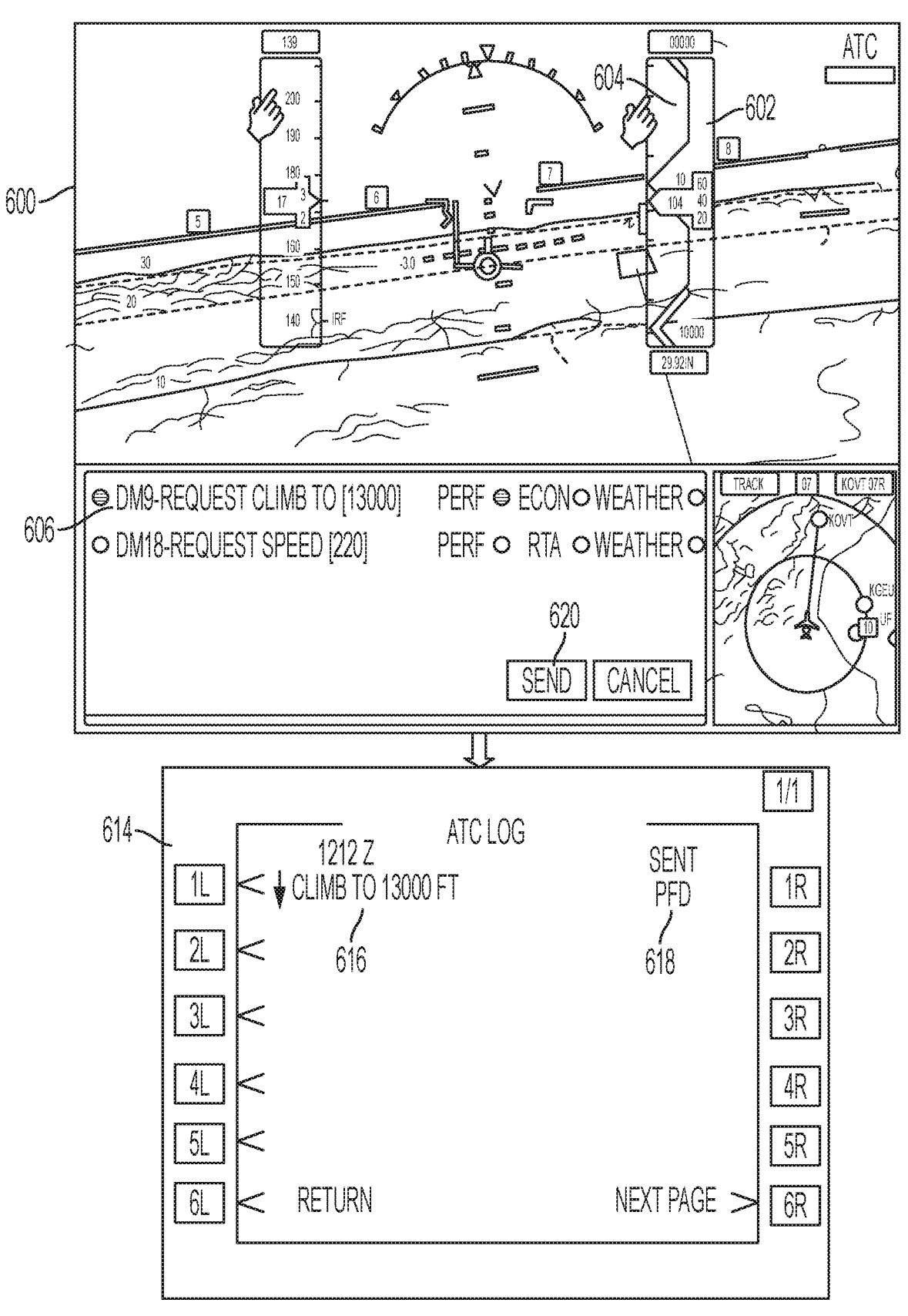
FIG. 7 illustrates one example of generating an ATC downlink message on a primary flight display.
Figure 8:
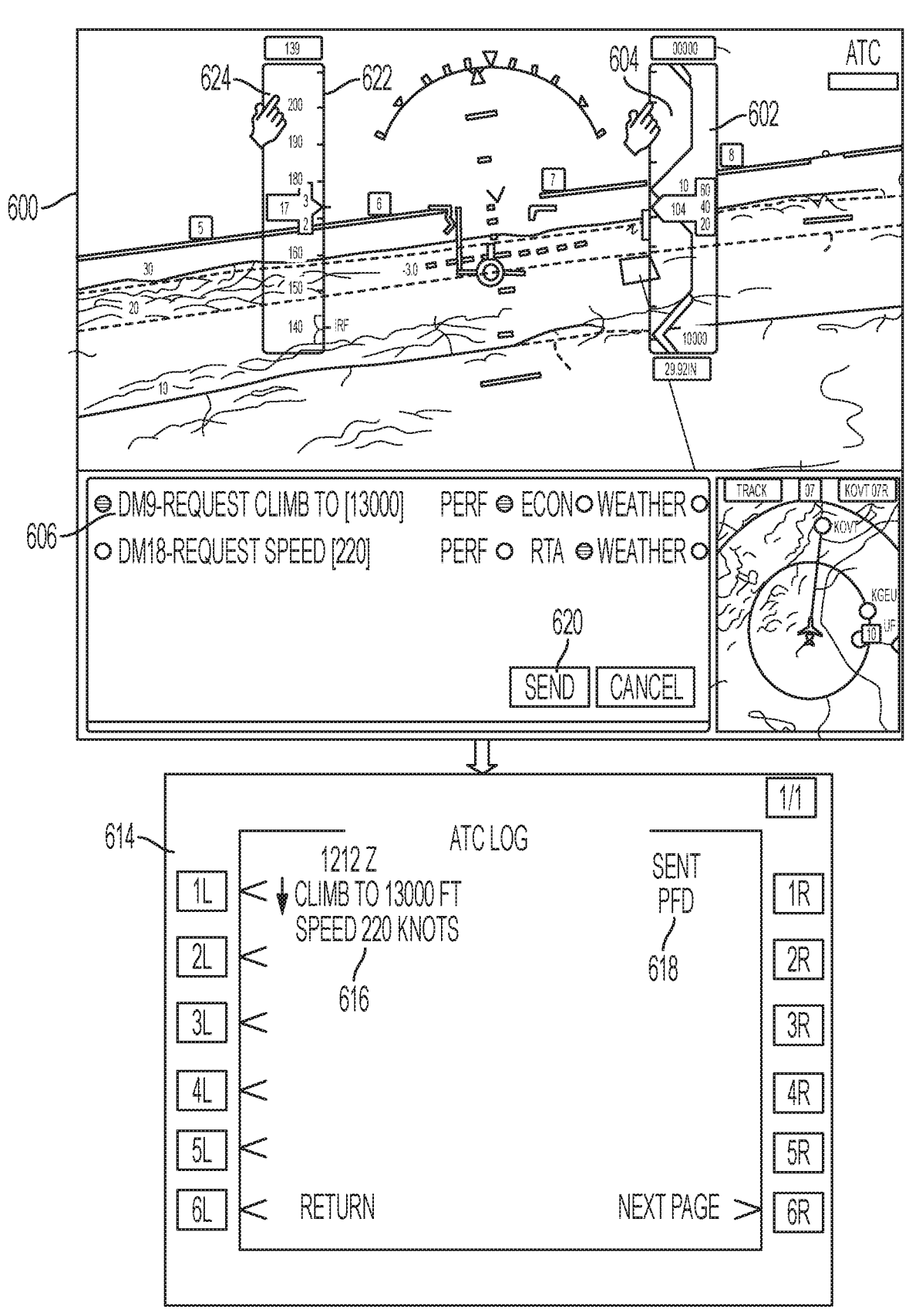
FIG. 8 illustrates one example of generating a multiple downlink ATC message on a primary flight display.
Figure 9:
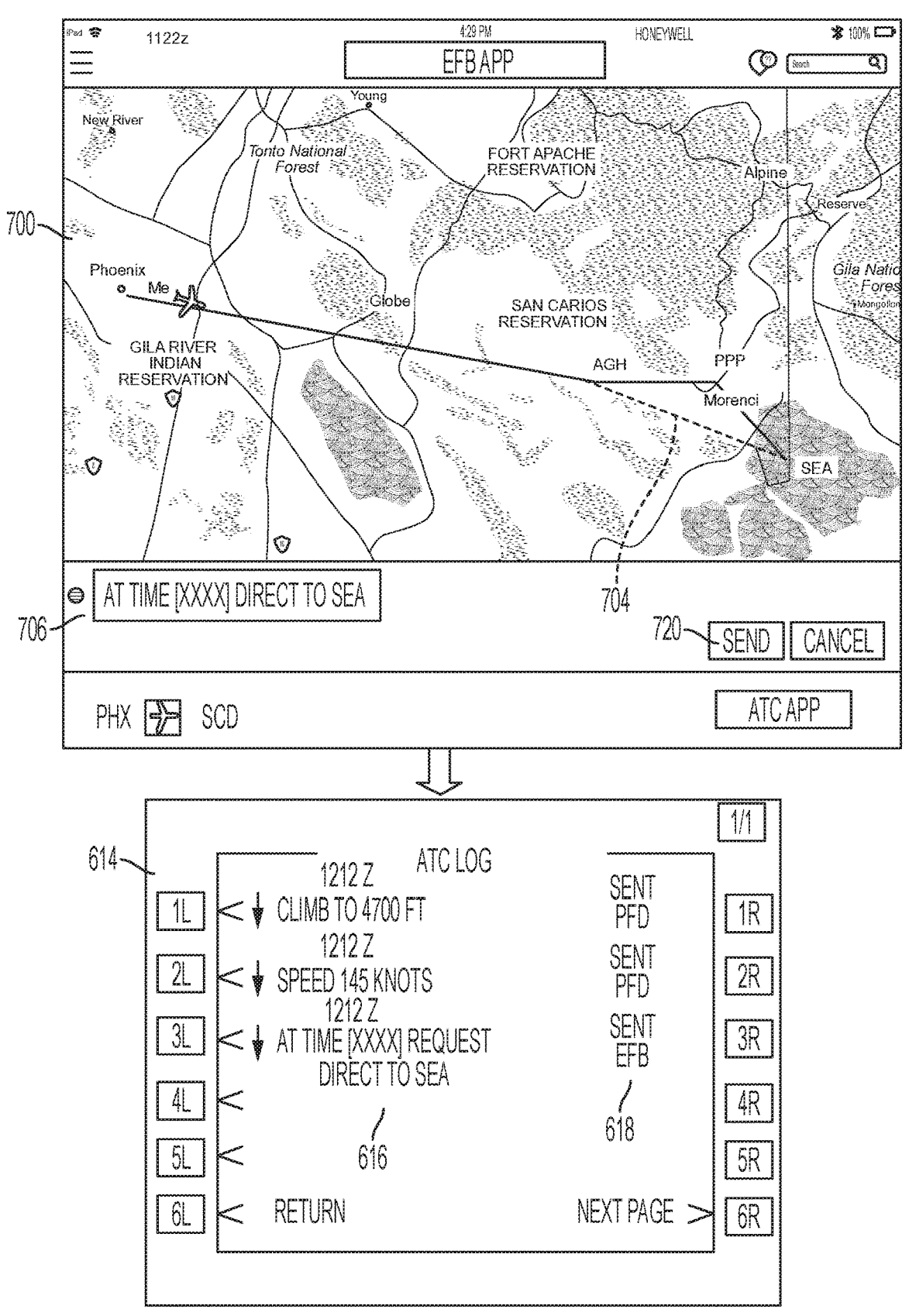
FIG. 9 illustrates one example of generating an ATC downlink message on an offboard avionics device.

FIGS. 7, 8 and 9 illustrate additional examples of generating ATC downlink messages using other types of avionics devices with graphical displays. FIG. 7 illustrates an example of generating an ATC downlink message with a single element request on the graphical display of a primary flight display. FIG. 8 illustrates an example of generating an ATC downlink message with multiple element request on a primary flight display. FIG. 9 illustrates an example of generating an ATC downlink message on an offboard avionics device such as an electronic flight bag (EFB). Each of these examples is described in turn below with reference to FIGS. 3, 4A and 4B as appropriate. It is understood that these examples also can be implemented using process 200 of FIG. 2 on system 100 of FIG. 1.

C. Use Case: Single ATC Downlink Message from Primary Fight Display (Altitude)

The primary flight display is an avionics device that can also be used to generate an ATC downlink message. In this embodiment, a member of the flight crew uses the primary flight display, such as PFD 302-3 of FIG. 3, to request a change in the altitude of the aircraft as shown in FIG. 7. Using process 200 or processes 400 and 450 as described above, a crew member indicates the desired altitude on altitude ribbon 602 of graphical display 600 of the primary flight display (PFD). This selection is made either via tapping graphical display 600 (such as a touchscreen) at the desired altitude indicated by 604, or by use of a cursor control to select the desired altitude. The ATC downlink message is generated by CMU 304 and presented to the flight crew as shown at 606 in FIG. 7 for approval. If approved, the flight crew indicates such approval by selecting send button 620. The ATC downlink message is added to the ATC log 614 as indicated at 616 with an indication that the ATC downlink message originated with the primary flight display 302-3 as shown at 618.

D. Use Case: Multiple ATC Downlink Message from PFD (Altitude and Speed)

In some instances, the flight crew may need to change more than one flight parameter at a time. Further, some avionics devices may support changes to more than one flight parameter. One example of a so-called "multiple ATC downlink message element" is a message that requests changes to both the altitude and speed of the aircraft. This type of message is supported, for example, by the primary flight display 302-3.

Similar to the description of FIG. 7 above, using process 200 or processes 400 and 450, a fight crew member indicates the desired altitude on altitude ribbon 602 of graphical display 600 of the PFD. This selection is made either by tapping graphical display 600 at the desired altitude indicated at 604, or by use of a cursor control to select the desired altitude. Additionally, the flight crew member also indicates the desired air speed on the air speed ribbon 622 of graphical display 600 of the PFD. Again, this selection is made by tapping or moving a cursor to the desired location indicated at 624. The ATC downlink message is generated by CMU 304 based on the selected air speed and altitude data provided by PFD 302-3 to CMU 304. The ATC downlink message is presented to the flight crew as shown at 606 in FIG. 8 for approval. If approved, the flight crew indicates such approval by selecting the send button 620. The multiple ATC downlink message element message is added to the ATC log 614 as indicated at 616 with the indication that the multiple message element downlink message originated with the primary flight display 302-3 as shown at 618.

In some embodiments, the multiple message elements of a multiple element downlink message can be entered using more than one avionics device. For example, altitude and speed message elements may be entered on a primary flight display while a route change message element may be entered on an electronic flight bag. The ATC application, in this example, would combine these three message elements into a multiple ATC downlink message element message.

E. Use Case: Route Change Request from Offboard Unit

In some embodiments, an offboard unit such as an Electronic Flight Bag (EFB) can be used to generate an ATC downlink message (single or multiple). In this example, the EFB 302-4 is used to generate an ATC downlink message to request a change to the route for the aircraft as shown in FIG. 9. Using process 200 or processes 400 and 450 as described above, a crew member indicates the desired route change on graphical display 700. This route change is entered either by drawing the change on graphical display 700 (touch screen) indicated by the line segment at 704, or by use of a cursor control to select the desired route. The ATC downlink message is generated by CMU 304 or EFB 302-4 and presented to the flight crew as shown at 706 in FIG. 9 for approval. It is noted that the ATC downlink message can be presented to the flight crew on the EFB 302-4 or on an HMI/display where the display is generated by another avionics device hosting an application like a CMU, CMF or FMS. If the ATC downlink message is acceptable to the flight crew, the flight crew indicates approval to send the message by selecting send button 720. The ATC downlink message is added to the ATC log 614 as indicated at 616 with an indication that the ATC downlink message originated with the electronic flight bag 302-4 as shown at 618.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory or other non-transitory computer readable medium. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

Example Embodiments

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a method for generating an air traffic control (ATC) request, the method comprising: receiving input on at least one of an onboard graphical display avionics device or an offboard avionics device to request a change to a current flight parameter based on an active state of the aircraft; generating an air traffic control request, on one of the onboard graphical display avionics device or the offboard avionics device, based on the input using an air traffic control interface application; presenting, on one of the onboard graphical display avionics device or the offboard avionics device, the generated air traffic control request; when the air traffic control request is approved to be sent, passing the generated air traffic control request to an air traffic control application on a communications management unit (CMU), Communications Management Function (CMF) or a flight management system (FMS); storing an indication of the origin of the air traffic control request in a log of the CMU, CMF or FMS; and transmitting the air traffic control request to an Air Traffic Control center.

Example 2 includes the method of example 1, wherein receiving an input comprises receiving an input on one or more of a navigational display, a primary flight display, an electronic flight bag (EFB), a tablet, a smart phone, a portable electronic device, a Maintenance Terminal, or a Cabin terminal.

Example 3 includes the method of example 2, and further including registering the one or more of the navigational display, the primary flight display, the electronic flight bag (EFB), the tablet, the smart phone, the portable electronic device, the Maintenance Terminal, or the Cabin terminal in a configuration database on the CMU, CMF or FMS, wherein the configuration database indicates the parameters that can be used to generate an air traffic control request for the registered display system.

Example 4 includes the method of any of examples 1-3, wherein generating an air traffic control request further includes: calling a function on the CMU, CMF or FMS to generate the air traffic control request; and referring to a configuration database of registered avionics devices to determine which parameters to use for the air traffic control request based on the onboard or offboard avionics device that initiated generation of the air traffic control request.

Example 5 includes the method of any of examples 1-4, and further comprising, on the one of the onboard graphical display avionics device or the offboard avionics device, receiving a selection to enable generation of an air traffic control request; and capturing data for the air traffic control request from the one of the onboard graphical display avionics device or the offboard avionics device.

Example 6 includes the method of any of examples 1-5, wherein receiving input comprises receiving input via one of a touchscreen or a cursor control of the one of the onboard graphical display avionics device or the offboard avionics device.

Example 7 includes the method of example 6, wherein receiving input on the touchscreen comprises receiving an input by sensing a tap on at least one of an airspeed ribbon or an altitude ribbon of a primary flight display unit.

Example 8 includes the method of any of examples 6-7, wherein receiving input on the touchscreen comprises receiving an input by sensing a tap on a primary flight display or an electronic flight bag indicating a proposed change to a route of a flight plan.

Example 9 includes the method of any of examples 1-8, wherein generating an air traffic control request comprises generating an air traffic control request for more than one flight parameter.

Example 10 includes the method of example 9, wherein the flight parameters for a multiple message element ATC request are received on one or more of the onboard graphical display avionics device or the offboard avionics device.

Example 11 includes the method of any of examples 1-10, And further comprising displaying an indication of the source of the air traffic control request in a log of the air traffic control application.

Example 12 includes a system for generating an air traffic control (ATC) downlink message, the system comprising: at least one avionics device with a human-machine interface with a graphical display, a processor and a non-transitory computer readable medium that stores an ATC interface application; a communication management unit (CMU), flight management system (FMS) or communication management function (CMF), coupled to the avionic device, wherein the CMU, FMS, or CMU includes a processor and a non-transitory computer readable medium that stores an air traffic control (ATC) application; wherein the ATC interface application, when run on the processor of the at least one avionics device, causes the processor to capture data for an ATC downlink message, to generate the ATC downlink message and to send the ATC downlink message to the ATC application on the CMU, FMS, or CMF; and wherein the ATC application, when run on the processor of the CMU, causes the processor to send the ATC downlink message to an ATC center and to store an indication of the origin of the ATC downlink message.

Example 13 includes the system of example 12, wherein the at least one avionics device comprises one or more of a navigational display, a primary flight display, an electronic flight bag (EFB), a tablet, a smart phone, a portable electronic device, a Maintenance Terminal, or a Cabin terminal.

Example 14 includes the system of any of examples 12-13, and further comprising a configuration database that is configured to register the at least one avionics device that is coupled to the CMU, FMS, or CMF, wherein the configuration database indicates the parameters that can be used to generate an air traffic control downlink message for the registered at least one avionics device.

Example 15 includes the system of any of examples 12-14, wherein the ATC interface application, when run on the processor of the at least one avionics device, causes the processor to capture data for a multiple elements of a multiple element ATC downlink message.

Example 16 includes the system of any of examples 12-15, wherein the ATC interface application, when run on the processor of the at least one avionics device, causes the processor to generate the ATC downlink message by sending the data to the ATC application on the CMU, FMS, or CMF.

Example 17 includes a method for generating an air traffic control (ATC) downlink message, the method comprising: receiving input on at least one of an onboard graphical display avionics device or an offboard avionics device to request a change to a current flight parameter based on an active state of the aircraft; generating, on one of the onboard graphical display avionics device or the offboard avionics device, a call to an air traffic control application running on a communications management unit (CMU) or communications management function (CMF) or flight management system (FMS), the call based on the input; receiving the ATC downlink message from the CMU, CMF, or FMS in response to the call; displaying, on one of the onboard graphical display avionics device or the offboard avionics device, the ATC downlink message; when the ATC downlink message is approved to be sent, passing the ATC downlink message to the air traffic control application on the CMU, CMF, or FMS.

Example 18 includes the method of example 17, wherein receiving an input comprises receiving an input on one or more of a navigational display, a primary flight display, an electronic flight bag (EFB), a tablet, a smart phone, a portable electronic device, a Maintenance Terminal, or a Cabin terminal.

Example 19 includes the method of any of examples 17-18, and further comprising, on the at least one of the onboard graphical display avionics device or the offboard avionics device, receiving a selection to enable generation of an ATC downlink message; and capturing data for the ATC downlink message from the at least one of the onboard graphical display avionics device or the offboard avionics device.

Example 20 includes the method of any of examples 17-19, wherein receiving input comprises receiving input via one of a touchscreen or a cursor control.

What is claimed is:

1. A method for generating an air traffic control (ATC) request, the method comprising:

receiving input on at least one of an onboard graphical display avionics device or an offboard avionics device to request a change to a current flight parameter based on an active state of an aircraft;

generating an air traffic control request, on the at least one of the onboard graphical display avionics device or the offboard avionics device, based on the input using an air traffic control interface application;

presenting, on one of the onboard graphical display avionics device or the offboard avionics device, the generated air traffic control request;

when the air traffic control request is approved to be sent, passing the generated air traffic control request to an air traffic control application on a communications management unit (CMU), Communications Management Function (CMF) or a flight management system (FMS);

storing an indication of which of the one of the onboard graphical display avionics device or the offboard avionics device generated the air traffic control request in a log of the CMU, CMF or FMS; and transmitting the air traffic control request to an Air Traffic Control center.

2. The method of claim 1, wherein receiving an input comprises receiving an input on one or more of a navigational display, a primary flight display, an electronic flight bag (EFB), a tablet, a smart phone, a portable electronic device, a Maintenance Terminal, or a Cabin terminal.

3. The method of claim 2, and further including registering the one or more of the navigational display, the primary flight display, the electronic flight bag (EFB), the tablet, the smart phone, the portable electronic device, the Maintenance Terminal, or the Cabin terminal in a configuration database on the CMU, CMF or FMS, wherein the configuration database indicates parameters that can be used to generate an air traffic control request for the registered one or more of the navigational display, the primary flight display, the electronic flight bag (EFB), the tablet, the smart phone, the portable electronic device, the Maintenance Terminal, or the Cabin terminal.

4. The method of claim 1, wherein generating an air traffic control request further includes:

calling a function on the CMU, CMF or FMS to generate the air traffic control request; and referring to a configuration database of registered avionics devices to determine which parameters to use for the air traffic control request based on the onboard graphical display avionics device or offboard avionics device that initiated generation of the air traffic control request.

5. The method of claim 1, and further comprising, on the at least one of the onboard graphical display avionics device or the offboard avionics device, receiving a selection to enable generation of an air traffic control request; and gathering data for the air traffic control request from the at least one of the onboard graphical display avionics device or the offboard avionics device.

6. The method of claim 1, wherein receiving input comprises receiving input via one of a touchscreen or a cursor control of the at least one of the onboard graphical display avionics device or the offboard avionics device.

7. The method of claim 6, wherein receiving input on the touchscreen comprises receiving an input by sensing a tap on at least one of an airspeed ribbon or an altitude ribbon of a primary flight display unit.

8. The method of claim 6, wherein receiving input on the touchscreen comprises receiving an input by sensing a tap on a primary flight display or an electronic flight bag indicating a proposed change to a route of a flight plan.

9. The method of claim 1, wherein generating an air traffic control request comprises generating an air traffic control request for more than one flight parameter.

10. The method of claim 9, wherein the more than one flight parameter for a multiple message element ATC request are received on the at least one of the onboard graphical display avionics device or the offboard avionics device.

11. The method of claim 1, and further comprising displaying an indication of a source of the air traffic control request in a log of the air traffic control application.

12. A system for generating an air traffic control (ATC) downlink message, the system comprising:

at least one avionics device with a human-machine interface with a graphical display, a processor and a non-transitory computer readable medium that stores an ATC interface application;

a communication management unit (CMU), flight management system (FMS) or communication management function (CMF), coupled to the at least one avionics device, wherein the CMU, FMS, or CMU includes a processor and a non-transitory computer readable medium that stores an air traffic control (ATC) application;

wherein the ATC interface application, when run on the processor of the at least one avionics device, causes the processor to gather data for an ATC downlink message, to generate the ATC downlink message and to send the ATC downlink message to the ATC application on the CMU, FMS, or CMF; and wherein the ATC application, when run on the processor of the CMU, causes the processor to send the ATC downlink message to an ATC center, and to store an indication that the ATC downlink message was generated by the at least one avionics device.

13. The system of claim 12, wherein the at least one avionics device comprises one or more of a navigational display, a primary flight display, an electronic flight bag (EFB), a tablet, a smart phone, a portable electronic device, a Maintenance Terminal, or a Cabin terminal.

14. The system of claim 12, and further comprising a configuration database that is configured to register the at least one avionics device that is coupled to the CMU, FMS, or CMF, wherein the configuration database indicates parameters that can be used to generate an air traffic control downlink message for the registered at least one avionics device.

15. The system of claim 12, wherein the ATC interface application, when run on the processor of the at least one avionics device, causes the processor to gather data for a multiple elements of a multiple element ATC downlink message.

16. The system of claim 12, wherein the ATC interface application, when run on the processor of the at least one avionics device, causes the processor to generate the ATC downlink message by sending the data to the ATC application on the CMU, FMS, or CMF.

17. A method for generating an air traffic control (ATC) downlink message, the method comprising:

receiving input on at least one of an onboard graphical display avionics device or an offboard avionics device to request a change to a current flight parameter based on an active state of an aircraft;

generating, on one of the onboard graphical display avionics device or the offboard avionics device, a call to an air traffic control application running on a communications management unit (CMU) or communications management function (CMF) or flight management system (FMS), the call based on the input;

receiving, on the one of the onboard graphical display avionics device or the offboard avionics device that generated the call, the ATC downlink message from the air traffic control application running on the CMU, CMF, or FMS in response to the call;

displaying, on the one of the onboard graphical display avionics device or the offboard avionics device, the ATC downlink message; and when the ATC downlink message is approved to be sent, passing the ATC downlink message to the air traffic control application on the CMU, CMF, or FMS.

18. The method of claim 17, wherein receiving an input comprises receiving an input on one or more of a navigational display, a primary flight display, an electronic flight bag (EFB), a tablet, a smart phone, a portable electronic device, a Maintenance Terminal, or a Cabin terminal.

19. The method of claim 17, and further comprising, on the at least one of the onboard graphical display avionics device or the offboard avionics device, receiving a selection to enable generation of an ATC downlink message; and gathering data for the ATC downlink message from the at least one of the onboard graphical display avionics device or the offboard avionics device.

20. The method of claim 17, wherein receiving input comprises receiving input via one of a touchscreen or a cursor control.

\* \* \* \* \*